J. H. MARVIL.
Improvement in Fruit Crates.
No. 124,366. Patented March 5, 1872.
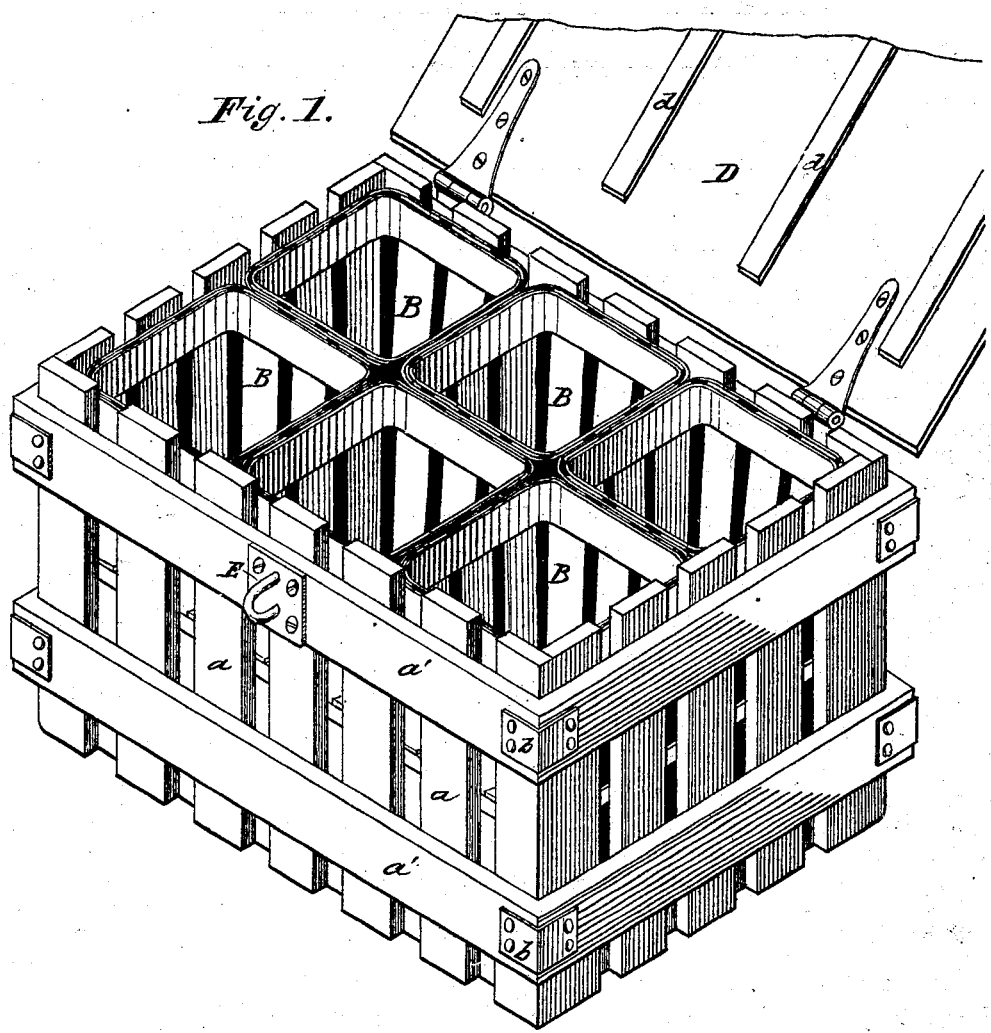
Fig. 1.
Fig. 2.
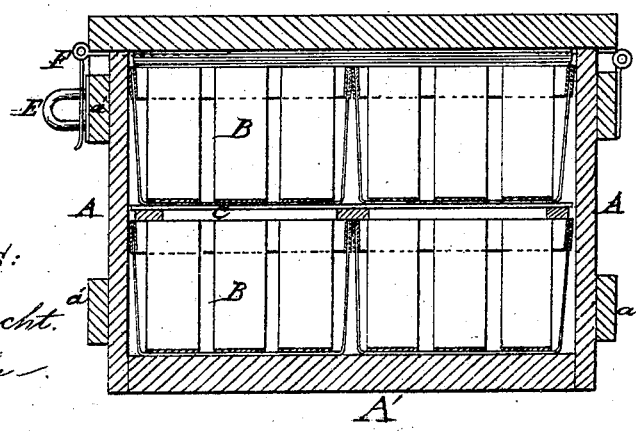

UNITED STATES PATENT OFFICE.

JOSHUA H. MARVIL, OF LAUREL, DELAWARE.

IMPROVEMENT IN FRUIT-CRATES.

Specification forming part of Letters Patent No. 124,366, dated March 5, 1872.

Be it known that I, JOSHUA H. MARVIL, of Laurel, in the county of Sussex and State of Delaware, have invented an Improvement in Crates or Boxes for the transportation of fruits, of which I declare the following to be a description:

My invention consists in an improvement in fruit-crates, by which the small baskets are held more firmly in their respective places. There is no damage by mashing, and a free circulation of air is admitted around all parts of your fruit.

In the accompanying drawing, Figure 1 is an isometrical figure of my crate or box, containing baskets for the fruit. Fig. 2 is a cross-section of the same.

In the drawing, A represents the box, with a stout bottom, A', made with narrow vertical strips $a\ a$, surrounded by two longitudinal strips, $a'\ a'$, firmly secured at the corners by angle-irons $b\ b$, the whole forming a very strong box or crate, with openings, however, sufficient to good ventilation. The baskets B B are placed into the box, the first layer being placed on the bottom; then I place a thin lattice-work, C, Fig. 2, of very thin strips upon these baskets, this lattice-work being so made that an opening of suitable width shall come over the middle of each tier of baskets. Upon this lattice-work C another layer of baskets is placed, and so on till the box is full. The lid D of the box (hinged thereto) has a number of thin strips, $d\ d$, which just fit upon the rows of wires of the upper layer of baskets, and keep the whole number of baskets firmly in position, allowing no vertical movement whatever. A staple, E, is fastened to the box, and a clasp, F, to the lid, so that the box may be locked during transportation with a padlock.

The great advantages of my invention will be readily understood by those familiar with the transportation of perishable fruits. A free circulation of air is obtained through the entire box. The fruit is not liable to be mashed, this being effectually prevented by the lattice-work C, and the fruit cannot spill from one basket to the other.

Having thus described my invention, what I claim, and desire to secure by Letters Patent, is—

The crate herein described, consisting of the box A having the vertical strips $a\ a$, horizontal strips $a'\ a'$, bottom A', lid D $d$, and layers of lattice-work C, arranged as shown, for the purpose set forth.

In testimony whereof I have signed my name to this specification in the presence of two subscribing witnesses.

JOSHUA H. MARVIL.

Witnesses:
 BENJ. R. RIGGIN,
 VANDROTH G. MARVIL.